United States Patent
Badlani et al.

(10) Patent No.: US 11,169,786 B2
(45) Date of Patent: Nov. 9, 2021

(54) GENERATING AND USING JOINT REPRESENTATIONS OF SOURCE CODE

(71) Applicant: X Development LLC, Mountain View, CA (US)

(72) Inventors: Rohan Badlani, Stanford, CA (US); Owen Lewis, Stanford, CA (US); Georgios Evangelopoulos, Venice, CA (US); Olivia Hatalsky, San Jose, CA (US); Bin Ni, Fremont, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 16/781,344

(22) Filed: Feb. 4, 2020

(65) Prior Publication Data

US 2021/0240453 A1 Aug. 5, 2021

(51) Int. Cl.
*G06F 9/44* (2018.01)
*G06F 8/41* (2018.01)
*G06N 20/00* (2019.01)
*G06F 8/73* (2018.01)
*G06F 8/38* (2018.01)
*G06N 3/04* (2006.01)

(52) U.S. Cl.
CPC .......... *G06F 8/42* (2013.01); *G06F 8/38* (2013.01); *G06F 8/73* (2013.01); *G06N 3/0454* (2013.01); *G06N 20/00* (2019.01)

(58) Field of Classification Search
None
See application file for complete search history.

(56) References Cited

U.S. PATENT DOCUMENTS

| 10,382,799 | B1  |   | 8/2019  | Walters et al. |
|------------|-----|---|---------|---------------|
| 10,809,983 | B1  | * | 10/2020 | Reas ............... G06F 8/33 |
| 2019/0026106 | A1 |   | 1/2019  | Burton et al. |
| 2020/0104102 | A1 |   | 4/2020  | Brockschmidt et al. |
| 2020/0175102 | A1 | * | 6/2020  | Sobran ............ G06F 8/42 |
| 2020/0218535 | A1 | * | 7/2020  | Alomari ......... G06F 16/9027 |
| 2020/0249918 | A1 | * | 8/2020  | Svyatkovskiy ..... G06F 8/42 |

(Continued)

OTHER PUBLICATIONS

Zhang et al., "A Novel Neural Source Code Representation ased on Abstract Syntax Tree," 2019 IEEE/ACM 41st International Conference on Software Engineering (ICSE) (Year: 2019).*

(Continued)

*Primary Examiner* — Insun Kang
(74) *Attorney, Agent, or Firm* — Middleton Reutlinger (57) ABSTRACT

Implementations are described herein for generating embeddings of source code using both the language and graph domains, and leveraging combinations of these semantically-rich and structurally-informative embeddings for various purposes. In various implementations, tokens of a source code snippet may be applied as input across a sequence-processing machine learning model to generate a plurality of token embeddings. A graph may also be generated based on the source code snippet. A joint representation may be generated based on the graph and the incorporated token embeddings. The joint representation generated from the source code snippet may be compared to one or more other joint representations generated from one or more other source code snippets to make a determination about the source code snippet.

12 Claims, 6 Drawing Sheets

(56) References Cited

U.S. PATENT DOCUMENTS

2020/0349052 A1* 11/2020 Wehr ............... G06F 8/427
2021/0034335 A1* 2/2021 Svyatkovskiy ........... G06F 8/33

OTHER PUBLICATIONS

Lao et al. (Cross-Modal Multistep Fusion Network With Co-Attention for Visual Question Answering), IEEE, 2018 (Year: 2018).*
Ben-Nun, "Neural Code Comprehension: A Learnable Representation of Code Semantics," 32nd Conference on Neural Information Processing Systems (NeurIPS 2018) (Year: 2018).*
Wan, et al., "Multi-Modal Attention Network Learning for Semantic Source Code Retrieval," May 1, 2019, https://yuleisui.github.io > publications > ase19 (Year: 2019).*
Nam et al., Dual Attention Networks for Multimodal Reasoning and Matching, IEEE 2017 (Year: 2017).*
Kusupati et al., Natural Language to Code Using Transformers (Year: 2019).*
Nam et al., Dual Attention Networks for Multimodal Reasoning and Matching, IEEE (Year: 2017).*
Barstad, Vera et al.; Predicting Source Code Quality with Static Analysis and Machine Learning; 13 pages; Norway; dated Jan. 2014.
Peeling, Paul; Big Data and Machine Learning for Predictive Maintenance; Matlab Expo 2017; 40 pages; dated 2017.
Alon, Uri et al.; code2vec: Learning Distributed Representations of Code; 30 pages; dated Oct. 30, 2018.
Gu, Xiaodong et al.l; DeepAM: Migrate APIs with Multi-modal Sequence to Sequence Learning; IJCAI; pp. 3675-3681; dated Apr. 25, 2017.
Gupta, Anshul et al.; Intelligent Code Reviews Using Deep Learning; KDD'18 Deep Learning Day; 9 pages; dated Aug. 2018.
Rodriguez, Jesus; Facebook Uses Machine Learning to Help Developers Write Code Faster; 9 pages; dated Apr. 2018.
Zhou, Jle et al.; Graph Neural Networks: A Review of Methods and Applications; pp. 1-20; dated Jan. 2019.
Bhattacharya, Pamela et al.; Graph-Based Analysis and Prediction for Software Evolution; IEEE; pp. 419-429; dated 2012.
Flache, Mike; How Machine Learning Can Improve Software Development Itself; pp. 1-5; dated Jul. 2017.
Allamanis, Miltiadis et al.; Learning to Represent Programs with Graphs; ICLR; pp. 1-17; dated 2018.
Schlichtkrull, Michael et al.; Modeling Relational Data with Graph Convolutional Networks; 9 pages; dated Oct. 26, 2017.
Maddison, Chris J. et al.; Structured Generative Models of Natural Source Code; ICML; 9 pages; dated 2014.
Raychev, Vaselin et al.; Probabilistic Model for Code with Decision Trees; 17 pages; dated 2016.
Raychev, Vaselin et al.; Predicting Program Properties form "Big Code"; POPL; 14 pages; dated Jan. 2015.
Montenegro, Robson; Source Code Classification Using Deep Learning—AYLIEN; pp. 1-13; dated Aug. 30, 2016.
Chen, Zimin et al.; A Literature Study of Embeddings on Source Code; p. 1-8; dated Apr. 5, 2019.
Yin, Pengcheng et al.; Learning to Represent Edits; ICLR; pp. 1-22; dated 2019.
Alon, Uri et al. Code2vec: learning distributed repr esentations of code. Proc. ACM Program. Lang. 3, POPL, Article 40; DOI:https://doi.org/10.1145/3290353; 29 pages; dated Jan. 2019.
Vaswani, A. et al. "Attention Is All You Need." Advances in Neural Information Processing Systems 30 (NIPS 2017), 11 pages; 2017.
Yang, et al. "XInet: Generalized Autoregressive Pretraining for Language Understanding." arXiv:1906.08237v1 [cs.CL]; 18 pages; dated Jun. 19, 2019.
Nguyen, A. et al.; "Using Topic Model to Suggest Fine-Grained Source Code Changes;" 2016 IEEE International Conference on Software Maintenance and Evolution (ICSME); pp. 200-210; Oct. 2, 2016.
Tufano, M. et al.; "Deep Learning Similarities from Different Representations of Source Code;" 2018 IEEE/ACM 15th International Conference on Mining Software Repositories; pp. 542-553; May 27, 2018.
Zimmermann; Mining Version Histories to Guide Software Changes; Saarland University; Germany; 10 pages; dated 2005.

* cited by examiner

GENERATING AND USING JOINT REPRESENTATIONS OF SOURCE CODE

BACKGROUND

A software application or program can be represented by raw source code text or using data structures like abstract syntax trees. The former is compact and readable and the latter captures information about the structure and syntax of the program.

SUMMARY

Techniques are described herein for combining contextual, semantic, syntactic, and/or structural aspects of source code into unified and meaningful joint representations. For example, techniques are described herein for combining embeddings generated from raw source code in the language and graph domains into semantically-rich and structurally-informative joint representations, or "hybrid" embeddings, which can then be leveraged for various purposes. These purposes may include but are not limited to source code change prediction, source code search, source code quality assessment, developer and source code analytics, and so forth.

In some implementations, individually-meaningful elements or "tokens" of a source code snippet, such as words, symbols, operators, punctuation, etc., may be processed using a sequence-processing machine learning model to generate one or more token embeddings in the language domain. This sequence-processing machine learning model may be unidirectional or bidirectional, and take various forms, such as various flavors of a recurrent neural network ("RNN"), for instance, a long short-term memory ("LSTM") network, a gated recurrent unit ("GRU") network, or a transformer network. In some implementations, a technique such as bidirectional encoder representations from transformers ("BERT") or a generalized autoregressive method (e.g., XLNet) may be employed to pretrain a bidirectional model such as transformer network to generate token embeddings that are semantically richer than token embeddings generated using other sequence-processing techniques, such as an RNN.

Meanwhile, in various implementations, a graph-based data structure also may be generated from the source code snippet, e.g., in parallel with generation of the token embeddings. The graph-based data structure may capture the structure and/or syntax of the source code snippet. In some such implementations, this graph-based data structure may take the form of an abstract syntax tree ("AST"), although this is not meant to be limiting.

In various implementations, the language domain data—e.g., the one or more token embeddings—may be combined with the graph domain data—e.g., the graph-based data structure—to generate a semantically-rich and structurally-informative joint representation of the underlying source code snippet. Put another way, the graph domain data exposes structural information that may be absent in the language domain data. For instance, a raw text model will combine information from tokens that are close together (e.g., on the page), but a graph model will combine information from spatially distant words that are nevertheless related, such as the output of a function and the text of the function definition.

The data from these domains may be combined in various ways to generate the joint representation. In some implementations, structural features from a graph neural network ("GNN") may be used as input embeddings to the sequence-processing machine learning model. In some implementations in which a transformer (e.g., BERT) network is employed, the transformer's attention mechanism may be informed by the positional input. For example, structural positional features such as shortest path distance between two tokens may be used as additional positional features for the transformer network. The attention mechanism may then handle identifying which tokens are most important. Using both sequence position and structural position may help the transformer model focus on both short-term sequence dependencies and long-term sequence dependencies.

Additionally or alternatively, in some implementations, contextual features extracted from raw source code text (e.g., using the sequence-processing machine learning model) may be used as starting features for structural message passing in a GNN. As one example, one or more token embeddings, or data indicative thereof or extracted therefrom, may be incorporated or "infused" into the graph data structure, e.g., as features of each node of an AST. Then, a joint representation such as a "hybrid embedding" may be generated from these infused graph data structures. For example, in some implementations, a machine learning model that operates on graph data structures, such as a GNN, may be applied to the infused graph data structure to generate the hybrid embedding.

Semantically and syntactically-rich joint representations of the underlying source code snippet generated using techniques described herein may be used for a variety of downstream purposes. As one example application, in some implementations, the joint representations may be used to make downstream code change predictions. For instance, another machine learning model such as an RNN may be trained using a time series of joint representations that were generated using techniques described herein. That machine learning model may then be able to, given a time sequence of joint representations, predict the next joint representation that represents an underlying source code snippet with predicted change(s).

As another example application, in some implementations, joint representations generated using techniques described herein may be used for searching source code bases. For example, a search query may take the form of a source code snippet for which similar source code snippet(s) are sought. A joint representation in the form of a hybrid embedding may be generated from the source code snippet. Other hybrid embeddings that are nearby may represent other similar source code snippets.

As another example application, in some implementations, joint representations generated using techniques described herein may be used for analyzing source code quality and/or conformance with quality guidelines. For example, given a training dataset of code segments labelled with quality scores, a machine learning model can be trained that processes graph embeddings generated using techniques described herein. This machine learning model can then be used to predict code quality scores of new source code snippets (or more particularly, of graph embeddings generated therefrom), and provide code analytics. These predicted code quality scores and/or analytics can be used to at least partially automate performance reviews and to discover sub-optimal source code snippets.

As another example application, in some implementations, comments and/or other prose related to source code snippets may be generated automatically using joint representations generated using techniques described herein. These comments may include, for instance, reviews of source code, intentions behind source code changes (which may be submitted when source code changes or "commits" are uploaded to a version control system), comments about how source code works, documentation snippets, version changes, example usages etc. In some such implementations, given comments associated with source code snippets, a machine learning model can be trained to predict reviews, comments, and/or intentions associated with a given source code snippet. Such a tool can save developer time and enhance productivity by automatically flagging code segments with potential reviews, comments, intentions, etc.

In some implementations, a method performed by one or more processors is provided that includes: applying tokens of a source code snippet as input across a sequence-processing machine learning model to generate a plurality of token embeddings; generating a graph based on the source code snippet; generating a joint representation based on the graph and the token embeddings; and comparing the joint representation generated from the source code snippet to one or more other joint representations generated from one or more other source code snippets to make a determination about the source code snippet.

In various implementations, generating the joint representation comprises incorporating the token embeddings into nodes of the graph that correspond to the tokens of the source code snippet. In various implementations, generating the joint representation comprises incorporating features extracted from nodes or edges of the graph into corresponding token embeddings. In various implementations, generating the joint representation includes processing the graph using a graph neural network ("GNN").

In various implementations, the joint representation comprises an aggregate embedding generated from the graph. In various implementations, the comparison is performed as part of a search for other source code similar to the source code snippet. In various implementations, the comparison is performed to automatically generate a comment associated with the source code snippet.

In various implementations, the determination about the source code snippet comprises a source code quality score. In various implementations, the graph comprises an abstract syntax tree. In various implementations, the sequence-processing machine learning model comprises a neural network that includes a self attention mechanism. In various implementations, the neural network comprises a transformer network.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
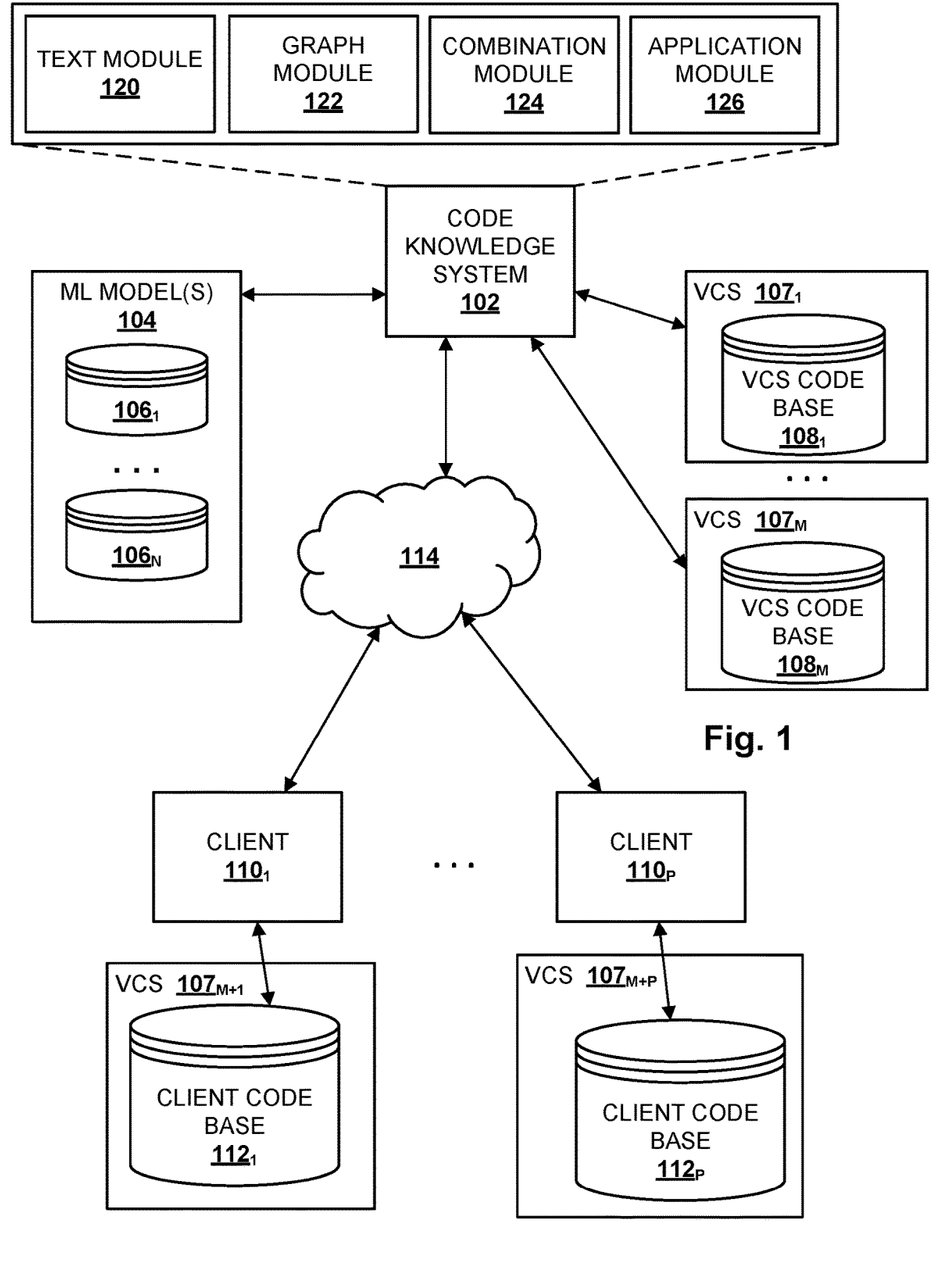
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs", tensor processing units or "TPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

Code knowledge system 102 may be configured to perform selected aspects of the present disclosure in order to help one or more clients $110_{1-P}$ to perform various tasks associated with one or more corresponding code bases $112_{1-P}$. In particular, code knowledge system 102 may be configured to combine contextual, semantic, syntactic, and/or structural aspects of source code into joint representations that are unified and meaningful across both the language and graph domains. These semantically-rich and structurally-informative joint representations may then be used for various tasks, such as source code change prediction, source code search, source code quality assessment, developer and source code analytics, and so forth.

Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancelations of flight, managing people associated with flights, such as passengers, air crews, and ground crews, managing airport gates, and so forth.

In various implementations, code knowledge system 102 may include or have access to a machine learning ("ML" in FIG. 1) database 104 that includes data indicative of one or more trained machine learning models $106_{1-N}$. These trained machine learning models $106_{1-N}$ may take various forms that will be described in more detail below, including but not limited to a GNN, a sequence-processing model such as various flavors of a recurrent neural network (e.g., LSTM, GRU, etc.), a transformer network pre-trained using techniques such as BERT or XLNet, and any other type of machine learning model that may be applied to facilitate selected aspects of the present disclosure.

In some implementations, code knowledge system 102 may also have access to one or more version control systems ("VCS") $107_{1-M}$, each with a respective code bases 108 that it manages. A VCS 107 may facilitate revision control of source code snippets contained in a code base 108. Revision control may include, for instance, the ability to revert a source code file to previous version(s), the ability to see who has modified a source code file, the ability to update a source code file as part of a larger migration or replatforming, the ability to access previous versions of source code snippets, etc.

Code bases $108_{1-M}$ be used, for instance, to train one or more of the machine learning models $106_{1-N}$. In some such implementations, multiple different versions of source code snippets stored in code bases $108_{1-M}$ by their respective VCS's $107_{1-M}$ may be used to train machine learning models $106_{1-N}$, to, for instance, predict source code edits, source code change intents, estimate code quality and/or conformance with various standards/styles, and so forth. As used herein, a code base 108 being deemed "up-to-date" is not meant to require that all the source code in the code base 108 be the absolute latest version. Rather, "up-to-date" may refer to a desired state of the code base 108 and/or of its constituent components (e.g., source code files, libraries, etc.), whether that desired state is the most recent version code base, the most recent version of the code base that is considered "stable," the most recent version of the code base that meets some other criterion (e.g., dependent on a particular library, satisfies some security protocol or standard), etc. As shown in FIG. 1, some clients 110 may also manage their code bases $112_{1-P}$ using respective VCSs $107_{M+1-M+P}$.

In various implementations, a client 110 that wishes to perform various tasks associated with its code base 112 may establish a relationship with an entity (not depicted in FIG. 1) that hosts code knowledge system 102. In some implementations, code knowledge system 102 may then access all or parts of the client's source code base 112 (with the client's consent), e.g., over one or more networks 114 such as the Internet, to facilitate encoding of source code using techniques described herein and application of those joint representations for various purposes.

Code knowledge system 102 may include various components that are configured to carry out selected aspects of the present disclosure. For example, in FIG. 1, code knowledge system 102 includes a text module 120, a graph module 122, a combination module 124, and an application module 126. In various implementations, one or more of modules 120-126 may be combined with other modules 120-126, or omitted.

Text module 120 may be configured to process raw source code using one or more sequence-processing machine learning models 106 from database 104 in order to generate token embeddings of the source code's tokens. Source code "tokens" may include any individual character, symbol, number, punctuation mark, word, phrase, operand, etc., that may serve some operative purpose or function in the source code. In some implementations, text module 120 may employ a transformer network that has been pretrained, e.g., using BERT or XLNet pretraining techniques, in order to generate the token embeddings. One benefit of using a transformer network over, say, a RNN, LSTM, or GRU network, is that with a transformer network, there is no requirement that the input source code sequence be processed in order. Consequently, more parallelization is possible during training, and long-range dependencies are easier to learn.

Graph module 122 may be configured to generate graph data structures from raw source code such that the graph data structures include information about the structure and/or syntax of the underlying raw source code. In some implementations, these data structures may take the form of ASTs, although this is not required. Additionally or alternatively, graph module 122 may be configured to process graph data structures using one or more graph-based machine learning models 106, such as a GNN, in order to generate graph embeddings that represent the underlying source code.

Combination module 124 may be configured to combine data from the language and graph domains into the contextually, semantically, syntactically, and/or structurally informative joint representations described herein, which in some cases may take the form of "hybrid embeddings." For example, combination module 124 may combine one or more of the token embeddings generated by text module 120 with the graph data structures or graph embeddings generated by graph module 122. In some implementations, combination module 124 may incorporate token embeddings generated by text module 120 based on a source code snippet into nodes of a graph data structure that correspond to the tokens of the source code snippet. Combination module 124 may then generate a hybrid embedding based on the graph data structure and the incorporated token embeddings.

Application module 126 may be configured to allow users (e.g., at clients $110_{1-P}$) to leverage the joint representations generated by combination module 124 for various tasks. These tasks may include, but are not limited to, source code change prediction, source code search, source code quality assessment, developer and source code analytics, and so forth. To this end, in some implementations, application module 126 may be configured to compare a joint representation generated from a source code snippet to one or more other joint representations generated from one or more other source code snippets to make a determination about the source code snippet.

For example, application module 126 may determine distance(s) between a newly-generated hybrid embedding and one or more other hybrid embeddings. These distances may represent similarities between the underlying source code snippet used to generate the newly-generated hybrid embedding and other source code snippets underlying the other hybrid embeddings. In various cases, these distances may be distances in latent space, and may be calculated using techniques such as cosine similarity, dot product, etc. These relative distances can be used for a variety of purposes, such as predicting source code changes, predicting intents behind source code changes (referred to herein as "code change intents"), evaluating source code quality and/or style, and so forth.

Figure 2:
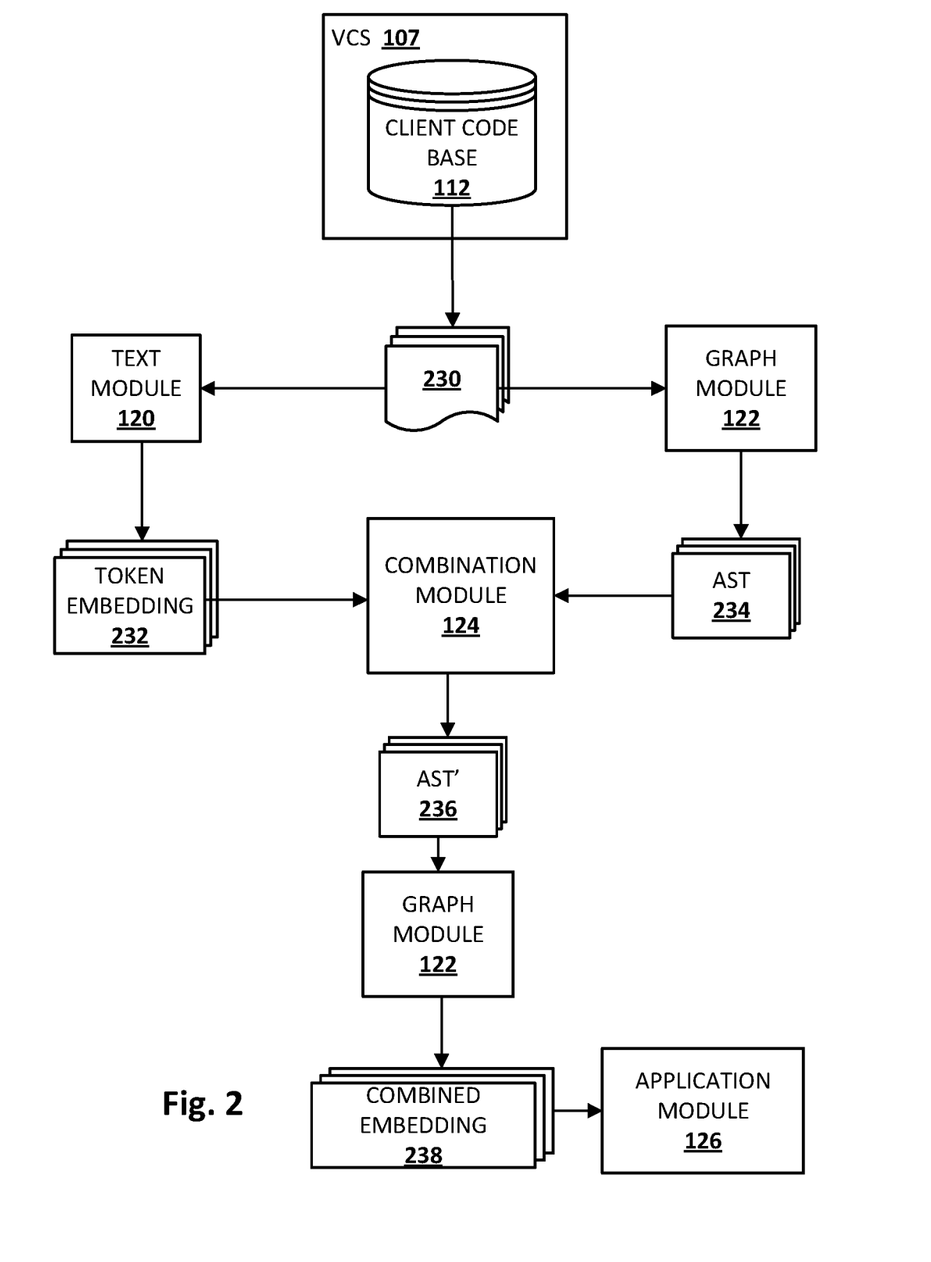
FIG. 2 is a block diagram of an example process flow.

FIG. 2 is a block diagram of example process flow(s) that may be implemented in whole or in part by code knowledge system 102 during training of machine learning models $106_{1-N}$ and/or during use of those models ("inference") to generate joint representations. Unless otherwise indicated, various components in FIG. 2 may be implemented using any combination of hardware and computer-readable instructions.

Beginning at top, one or more source code snippets 230 may be obtained, e.g., by code knowledge system 102 from a client code base 112, e.g., by way of the client's version control system 107. Each source code snippet 230 may comprise a semantically-meaningful portion of a source code file or an entire source code file, depending on the circumstances. For example, a particularly large source code file may be broken up into smaller snippets (e.g., delineated into functions, classes, methods, etc.), whereas a relatively short source code file may be kept intact throughout processing.

Text module 120 may process the source code snippet(s) 230 using one or more machine learning models (106 in FIG. 1) to generate token embedding(s) 232. Meanwhile, the same source code snippet(s) 230 may also be processed, e.g., by graph module 122 in parallel with the operations performed by text module 120, to generate abstract syntax tree(s) 234 (or more generally, graph data structures).

Combination module 124 may then combine the token embedding(s) 232 with the AST(s) 234 in various ways. In FIG. 2, for instance, combination module 124 generates what will be referred to herein as "augmented" abstract syntax tree(s) (AST') 236. These augmented abstract syntax tree(s) 236 may include, in their nodes, data indicative of the token embeddings 232 generated by text module 120. For example, each node and/or edge of an abstract syntax tree 234 may initially correspond to one or more tokens of the underlying source code. Combination module 124 may augment or infuse these nodes and/or edges with data indicative of the corresponding token embeddings 232.

The augmented abstract syntax tree(s) 236 may then be processed, e.g., by graph module 122 (or combination module 124 in some cases), to generate hybrid embedding(s) 238. For example, graph module 122 may use the data infused into the augmented abstract syntax tree(s) 236 as starting features for structural message passing using a GNN machine learning model (although non-message passing GNNs may also be employed). A hybrid embedding 238 generated using the GNN may be, for instance, an average, sum, concatenation, an aggregate embedding generated from the augmented abstract syntax tree 236, etc. Other combinations of the embeddings of the nodes and/or edges of the augmented abstract syntax tree 236 are contemplated. For example, in some implementations, embeddings may be generated for elements beyond tokens, such as entire functions, methods, entire files, and even full programs. The hybrid embedding(s) 238 may then be utilized by application module 126 for various purposes described herein.

The paradigm illustrated by FIG. 2 is not meant to be limiting. Data in the language and graph domains may be combined in various other ways to generate hybrid embeddings that encode the context, semantics, syntax, and/or structure of source code. For example, rather than infusing an abstract syntax tree 234 with token embeddings, as was the case with FIG. 2, in some implementations, structural/positional features (e.g., shortest path between two tokens in an abstract syntax tree 234) may be added as inputs for the machine learning model (e.g., transformer) applied by text module 120 to generate token embeddings 232. As a result, token embeddings 232 themselves may be structurally and/or positionally informative. Then, an attention mechanism of the transformer network may attend to identifying which tokens are most/least important and/or relevant. By using both sequence and structural position information in this manner, the transformer network is able to focus on both short-term and long-term sequence dependencies.

Figure 3:
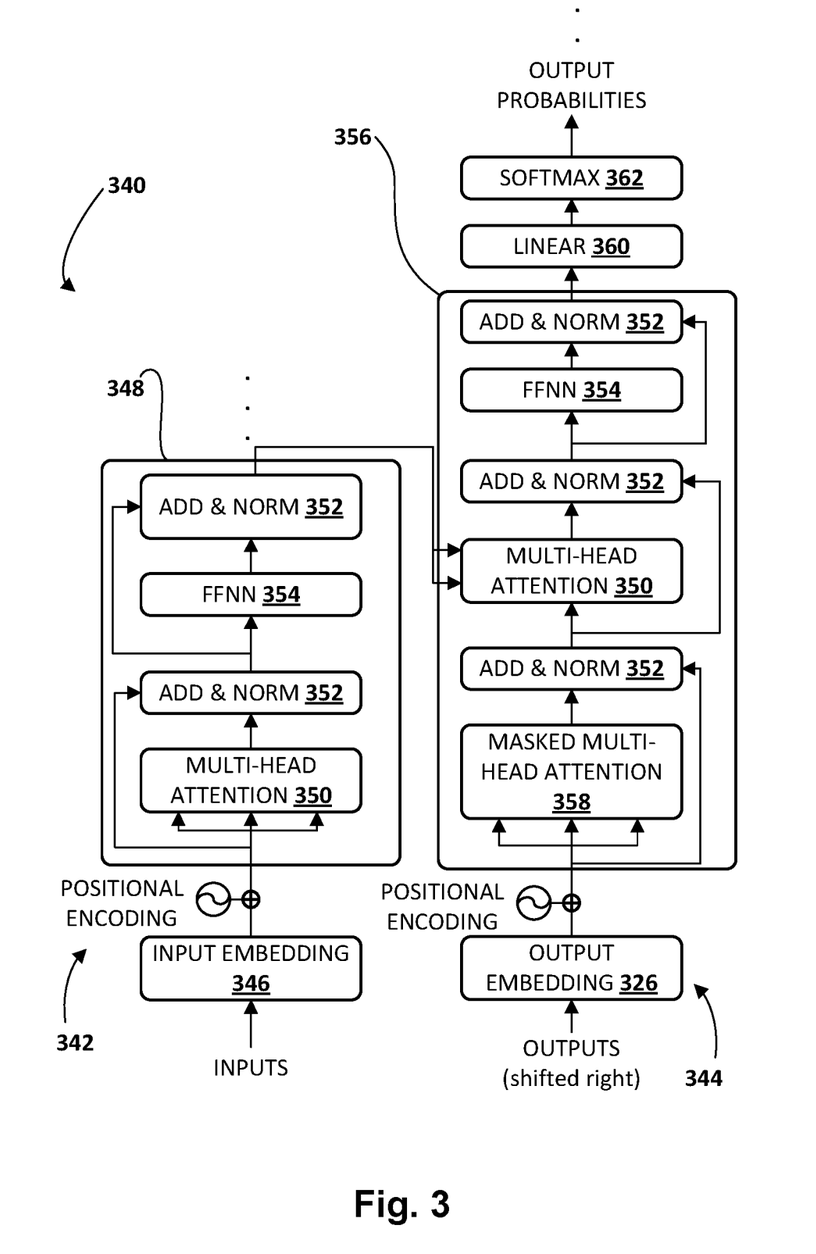
FIG. 3 schematically demonstrates one example of a transformer machine learning model architecture that may be used to implement selected aspects of the present disclosure.

FIG. 3 schematically illustrates an example architecture of a transformer machine learning model (or "network") 340 that may be applied, e.g., by text module 120, to perform selected aspects of the present disclosure. Transformer machine learning model 340 includes an encoder stack 342 on the left and a decoder stack 344 on the right. As indicated by the ellipsis, encoder stack 342 includes some number (positive integer) of individual encoder layers 348, which may or may not be identical to each other. Inputs (e.g., sequence of source code tokens) to the initial encoder layer 348 depicted in FIG. 3 are converted to embeddings 346, such that they contain a positional encoding of the input tokens.

Each encoder layer 348 includes a multi-head self-attention mechanism 350 and a position-wise fully connected feed forward neural network ("FFNN") 354. One residual connection is provided around multi-head self-attention mechanism 350 to a normalization layer 352. Another residual connection is provided around FFNN 354 to a second normalization layer 352. Outputs of the second normalization layer 352 are provided to downstream encoder layers 348 (represented by the ellipsis) and/or to component(s) of decoder stack 344 as described below.

As indicated by the ellipsis at top right, decoder stack 344 includes some number (positive integer, may be equal to the number of encoder layers 348) of decoder layers 356, which may or may not be identical to each other. Inputs to the initial decoder layer 356 include positionally-encoded output embeddings 326. Each decoder layer 356 includes a "masked" multi-head self-attention mechanism 358, a multi-head self-attention mechanism 350 similar to 350 of encoder layer 348, and another FFNN 354. In some implementations, and as indicated by the arrows from the top normalization layer 352 of encoder layer 348 in FIG. 3, multi-head self-attention mechanism 350 of decoder layer 356 performs multi-head attention over the output of encoder stack 342.

As was the case with individual encoder layer 348, in decoder layer 356, one residual connection is provided around masked multi-head self-attention mechanism 358 to a normalization layer 352, another residual connection is provided around multi-head self-attention mechanism 350, and yet another residual layer is provided around FFNN 354. In some implementations, the masked-multi-head self-attention mechanism 358 prevents token positions from attending to subsequent token positions, which ensures that predictions for a given token position can depend solely on the known outputs at lesser positions. Decoder stack 344 also includes a linear transformation layer 360 and a softmax layer 362.

Figure 4:
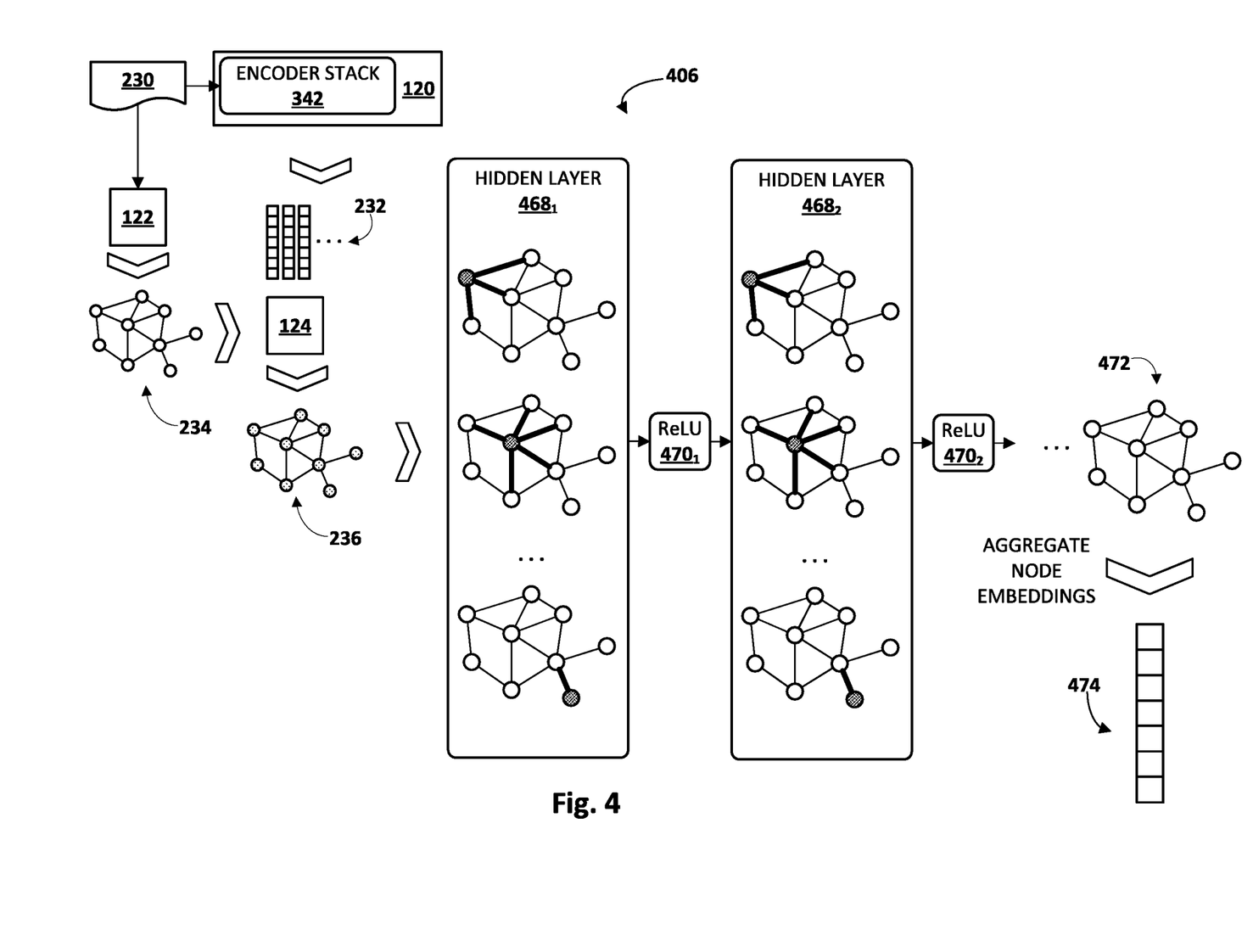
FIG. 4 schematically demonstrates an example of how techniques described herein may operate, in accordance with various implementations.

FIG. 4 depicts an example of how the transformer machine learning model 340 of FIG. 3 may be implemented, e.g., by code knowledge system 102, in conjunction with some of the other components of FIGS. 1 and 2. The process flow of FIG. 4 is similar to that of FIG. 2 in many respects. Starting at top left, a source code snippet 230 is processed by text module 120 using encoder stack 342 to generate token embeddings 232. Meanwhile, graph module 122 also processes source code snippet 230 to generate an abstract syntax tree 234. Abstract syntax tree 234 and token embeddings 232 are then processed by combination module 124 to generate a joint representation (e.g., a hybrid embedding) of source code snippet.

In some implementations, an augmented abstract syntax tree 236 with nodes/edges infused with features of token embeddings 232 may be generated. Augmented abstract syntax tree 236 may then be applied as input, e.g., by combination module 124, across a GNN 406. In particular, augmented abstract syntax tree 236 may be applied as input across some number (positive integer) of hidden layers $468_1$, $468_2$, ... and intermediate rectified linear units ("ReLU") $470_1$, $470_2$, ... to ultimately generate output 472. Output 472 may take the form of an abstract syntax tree in which the nodes have been infused with data from neighboring nodes for some number of iterations. The number of iterations may correspond to the number of hidden layers 468, and may be selected as a hyper parameter of GNN 406.

Within each hidden layer 468 of GNN 406, data from each node is propagated along an edge to immediate neighboring node(s), resulting in those neighboring nodes being infused with the data from the originating node. For instance, at the top of first hidden layer $468_1$, data from the shaded left-most node is propagated along three edges to be infused into three neighbor nodes. Below that (but potentially occurring in parallel), data from a middle shaded node is propagated along five edges to be infused into its five neighbor nodes. And so on until each node has infused its immediate neighbor nodes with data. This process is repeated for each hidden layer 468, with the output of each hidden layer 468 being processed using a ReLU 470 before being applied as input across the next hidden layer 468. The more hidden layers/iterations the greater radius of influence each node has on other nodes of the graph.

Data may be propagated along each edge and infused into neighbor nodes according to various functions. These functions may take various forms, such as feed forward neural networks and/or other mathematical calculations. Functions may also vary among edges depending on, for instance, what is represented by each edge. For example, a first function may be applied for a first type of edge corresponding to a first type of source code token. A second function may be applied for a second type of edge corresponding to a second type of source code token. Similarly, k different types of edges may be applied as k (positive integer) different learnable functions. And so on.

Aggregate node embeddings obtained from output 472 may be extracted and/or retrieved as a joint representation 474 (e.g., a hybrid embedding) of source code snippet 230. Joint representation 474 may then be leveraged, e.g., by application module 126 of code knowledge system 102, for various purposes and/or tasks, as described previously.

Figure 5:
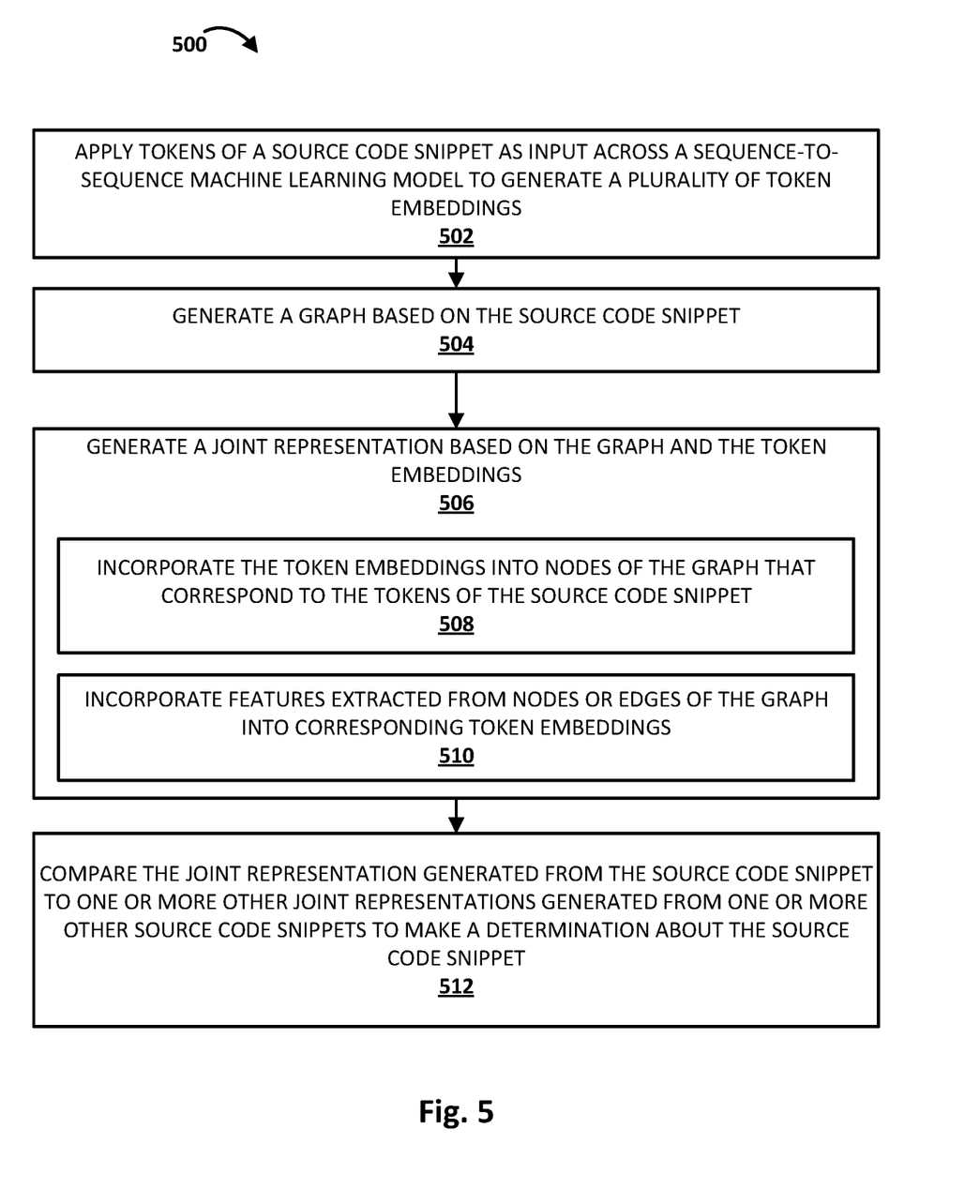
FIG. 5 depicts a flowchart illustrating an example method according to implementations disclosed herein.

FIG. 5 is a flowchart illustrating an example method 500 of practicing selected aspects of the present disclosure, in accordance with implementations disclosed herein. For convenience, the operations of the flow chart are described with reference to a system that performs the operations, such as code knowledge system 102. This system may include various components of various computer systems, such as one or more components of code knowledge system 102. Moreover, while operations of method 500 are shown in a particular order, this is not meant to be limiting. One or more operations may be reordered, omitted or added.

At block 502, the system, e.g., by way of text module 120, may apply tokens of a source code snippet as input across all or a portion of a sequence-processing machine learning model to generate a plurality of token embeddings. In some implementations, the sequence-processing machine learning model may be bidirectional, e.g., a bidirectional LSTM network or a transformer network. In some implementations, the sequence-processing machine learning model may include a self-attention mechanism (e.g., 350 in FIG. 3). In some implementations, the portion of the sequence-processing machine learning model that is used to generate the token embeddings includes encoder stack 342 of transformer machine learning model 340 in FIG. 3. In some implementations, decoder stack 344 may be used during training to train the machine learning model to generate joint representations (it may also be used to decode source code tokens from joint representations).

At block 504, which may or may not occur in parallel to the operations of block 502, the system, e.g., by way of graph module 122, may generate a graph (e.g., embodied in memory as a graph data structure) based on the source code snippet. As noted herein, in some implementations, this graph may take the form of an abstract syntax tree, although this is not required.

At block 506, the system, e.g., by way of combination module 124, graph module 122 and/or text module 120, may generate a joint representation based on the graph and the token embeddings. This may be accomplished in various ways. For example, in some implementations, at block 508, the system may generate an augmented abstract syntax tree by incorporating the token embeddings into nodes of the graph that correspond to the tokens of the source code snippet as demonstrated in FIGS. 2 and 4. Additionally or alternatively, in some implementations, at block 510, the system may incorporate features extracted from nodes or edges of the graph into corresponding token embeddings. In either case, a joint representation of the underlying source code snippet may be generated.

At block 512, the system, e.g., by way of application module 126, may compare the joint representation generated from the source code snippet to one or more other joint representations generated from one or more other source code snippets to make a determination about the source code snippet. These determinations may take various forms and may be used for various tasks. In some implementations, the determination made application module 126 may include a similarity between the source code snippet and other source code. For example, Euclidean distances may be determined between the joint representation generated from the source code snippet under consideration and other joint representations of other source code snippets. These distances may be used, for instance, as part of a search for similar source code, to determine a measure of quality of conformance of source code to standards/styles (e.g., embodied in source code snippets underlying the other joint representations), to predict code change intents and/or explanatory comments that should be added to code snippets to aid future readers, and so forth. Additionally or alternatively, in some implementations, the determination of block 512 may include an automatically-generated summary, review, or comment associated with the source code snippet. In some implementations, the determination of block 512 may include a source code quality score.

Figure 6:
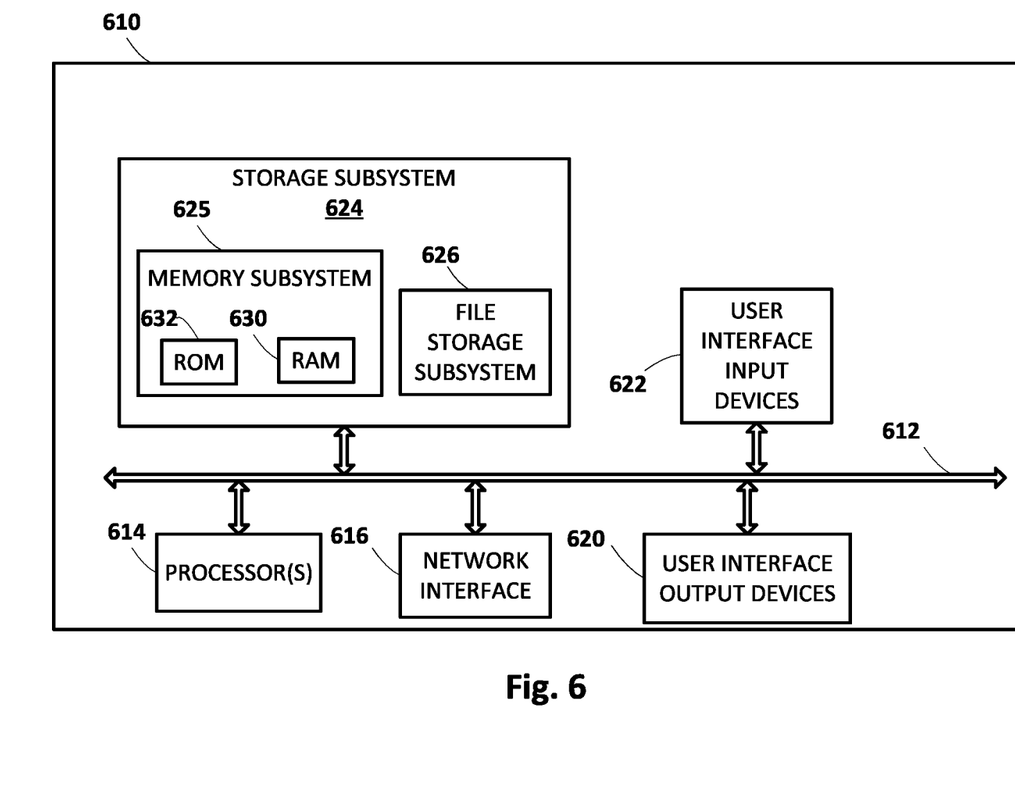
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 5, as well as to implement various components depicted in FIGS. 1-4.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    applying tokens of a source code snippet as input across a sequence-processing machine learning model to generate a plurality of token embeddings;
    generating a graph based on the source code snippet;
    augmenting the graph by infusing nodes of the graph that correspond to the tokens of the source code snippet with corresponding token embeddings of the generated plurality of token embeddings;
    processing the augmented graph using a graph neural network to generate a joint representation of the source code snippet, the joint representation comprising an aggregate node embedding based on the augmented graph infused with the corresponding token embeddings, wherein the aggregate node embedding is obtained by further infusing the nodes of the augmented graph with data indicative of the corresponding token embeddings from neighboring nodes for a number of iterations by propagating the date from each node along one or more edges to one or more immediate neighboring nodes;
    calculating one or more distances in latent space between the joint representation generated from the source code snippet and one or more other joint representations generated from one or more other source code snippets to make a determination about the source code snippet; and
    automatically generating a summary, review, or comment associated with the determination about the source code snippet.

2. The method of claim 1, wherein the joint representation comprises a mean over the aggregate node embeddings generated from the augmented graph.

3. The method of claim 1, wherein the calculating is performed as part of a search for other source code similar to the source code snippet.

4. The method of claim 1, wherein the determination about the source code snippet comprises a source code quality score.

5. The method of claim 1, wherein the graph comprises an abstract syntax tree.

6. The method of claim 1, wherein the sequence-processing machine learning model comprises a neural network that includes a self attention mechanism.

7. The method of claim 6, wherein the neural network comprises a transformer network.

8. A system comprising one or more processors and memory storing instructions that, in response to execution of the instructions by the one or more processors, cause the one or more processors to:
    apply tokens of a source code snippet as input across a sequence-processing machine learning model to generate a plurality of token embeddings;
    generate a graph based on the source code snippet;
    augment the graph by infusing nodes of the graph that correspond to the tokens of the source code snippet with corresponding token embeddings of the generated plurality of token embeddings;

process the augmented graph using a graph neural network to generate a joint representation of the source code snippet, the joint representation comprising an aggregate node embedding based on the augmented graph infused with the corresponding token embeddings, wherein the aggregate node embedding is obtained by further infusing the nodes of the augmented graph with data indicative of the corresponding token embeddings from neighboring nodes for a number of iterations by propagating the data from each node along one or more edges to one or more immediate neighboring nodes;

calculate one or more distances in latent space between the joint representation generated from the source code snippet and one or more other joint representations generated from one or more other source code snippets to make a determination about the source code snippet; and automatically generate a summary, review, or comment associated with the determination about the source code snippet.

9. The system of claim 8, wherein the determination comprises a similarity between the source code snippet and other source code.

10. The system of claim 8, wherein the determination about the source code snippet comprises a source code quality score.

11. The system of claim 8, wherein the sequence-processing machine learning model comprises a transformer network.

12. At least one non-transitory computer-readable medium comprising instructions that, in response to execution of the instructions by one or more processors, cause the one or more processors to:

apply tokens of a source code snippet as input across a sequence-processing machine learning model to generate a plurality of token embeddings;

generate a graph based on the source code snippet;

augment the graph by infusing nodes of the graph that correspond to the tokens of the source code snippet with corresponding token embeddings of the generated plurality of token embeddings;

process the augmented graph using a graph neural network to generate a joint representation of the source code snippet, the joint representation comprising an aggregate node embedding based on the augmented graph infused with the corresponding token embeddings, wherein the aggregate node embedding is obtained by further infusing the nodes of the augmented graph with data indicative of the corresponding token embeddings from neighboring nodes for a number of iterations by propagating the data from each node along one or more edges to one or more immediate neighboring nodes;

calculate one or more distances in latent space between the joint representation generated from the source code snippet and one or more other joint representations generated from one or more other source code snippets to make a determination about the source code snippet; and automatically generate a summary, review, or comment associated with the determination about the source code snippet.

* * * * *